(12) United States Patent
Taylor et al.

(10) Patent No.: US 11,041,112 B2
(45) Date of Patent: Jun. 22, 2021

(54) BREAKER SYSTEMS FOR WELLBORE TREATMENT OPERATIONS FOR USE AT VARYING TEMPERATURES

(71) Applicant: Halliburton Energy Services, Inc., Houston, TX (US)

(72) Inventors: Robert Stewart Taylor, Calgary (CA); Glen C. Fyten, Red Deer (CA); Michael Wayne Sanders, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/792,666

(22) Filed: Feb. 17, 2020

(65) Prior Publication Data

US 2020/0277528 A1 Sep. 3, 2020

Related U.S. Application Data

(60) Provisional application No. 62/812,815, filed on Mar. 1, 2019.

(51) Int. Cl.
*E21B 43/26* (2006.01)
*C09K 8/70* (2006.01)
*C09K 8/74* (2006.01)
*E21B 43/24* (2006.01)

(52) U.S. Cl.
CPC ............... *C09K 8/706* (2013.01); *C09K 8/74* (2013.01); *E21B 43/2408* (2013.01); *E21B 43/26* (2013.01); *C09K 2208/24* (2013.01); *C09K 2208/26* (2013.01)

(58) Field of Classification Search
CPC ...... C09K 8/706; C09K 8/74; C09K 2208/24; C09K 2208/26; E21B 43/2408; E21B 43/26
See application file for complete search history.

(56) References Cited

U.S. PATENT DOCUMENTS

| 5,362,408 | A | * | 11/1994 | Pakulski | C09K 8/685 166/308.5 |
| 5,393,439 | A | * | 2/1995 | Laramay | C09K 8/685 166/283 |
| 2006/0278389 | A1 | * | 12/2006 | Ayoub | C09K 8/68 166/250.1 |
| 2009/0025933 | A1 | * | 1/2009 | Garcia-Lopez de Victoria | C09K 8/74 166/279 |
| 2011/0259585 | A1 | * | 10/2011 | Banerjee | E21B 43/2406 166/272.3 |
| 2013/0112413 | A1 | * | 5/2013 | Muthusamy | E21B 43/267 166/300 |
| 2015/0060072 | A1 | * | 3/2015 | Busby | C09K 8/20 166/294 |
| 2020/0102487 | A1 | * | 4/2020 | Eluru | C09K 8/68 |

* cited by examiner

*Primary Examiner* — Silvana C Runyan
(74) *Attorney, Agent, or Firm* — Thomas Rooney; Baker Botts L.L.P.

(57) ABSTRACT

Compositions and methods of using such compositions to, for example, reduce the viscosity of treatment fluids are provided. In one embodiment, the methods include: providing a treatment fluid including a base fluid, a viscosifier, and a breaker system including a gel stabilizer; a delayed release oxidative breaker; and a delayed release enzyme breaker; and allowing the breaker system to reduce a viscosity of the treatment fluid.

9 Claims, 6 Drawing Sheets

BREAKER SYSTEMS FOR WELLBORE TREATMENT OPERATIONS FOR USE AT VARYING TEMPERATURES

CROSS-REFERENCE TO RELATED APPLICATION

The present application claims priority to U.S. Provisional Application Ser. No. 62/812,815 filed on Mar. 1, 2019.

BACKGROUND

The present disclosure relates to methods and compositions for treating subterranean formations, and more specifically, to improved methods and compositions for reducing the viscosity of viscosified treatment fluids.

Hydrocarbons, such as oil and gas, may commonly be obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation. A wellbore may be formed by drilling a hole into a subterranean formation known or suspected to contain valuable hydrocarbons. These drilling operations may often be carried out using complex drilling muds that may be gelled to create unique rheology profiles. Moreover, many fracturing methods and other wellbore treatment operations use a multitude of gelled and cross-linked fluids to perform specific tasks within the wellbore.

As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like. For certain treatment operations, it may be desirable to provide a viscosified treatment fluid having a high-viscosity value. For example, a viscosifier may be used to increase the viscosity of, or "gel," the treatment fluid to provide the higher viscosity needed to realize the maximum benefits from the treatment operation. After the viscosified treatment fluid has been used, it may be desirable to lower the viscosity of the treatment fluid. The viscosity of the treatment fluid may be lowered by "breaking" the gel. Breaking the viscosified treatment fluid may be accomplished by adding a "breaker," that is, a viscosity-reducing agent, to the treatment fluid.

BRIEF DESCRIPTION OF THE DRAWINGS

These drawings illustrate certain aspects of some of the embodiments of the present disclosure and should not be used to limit or define the claims.

Figure 1:
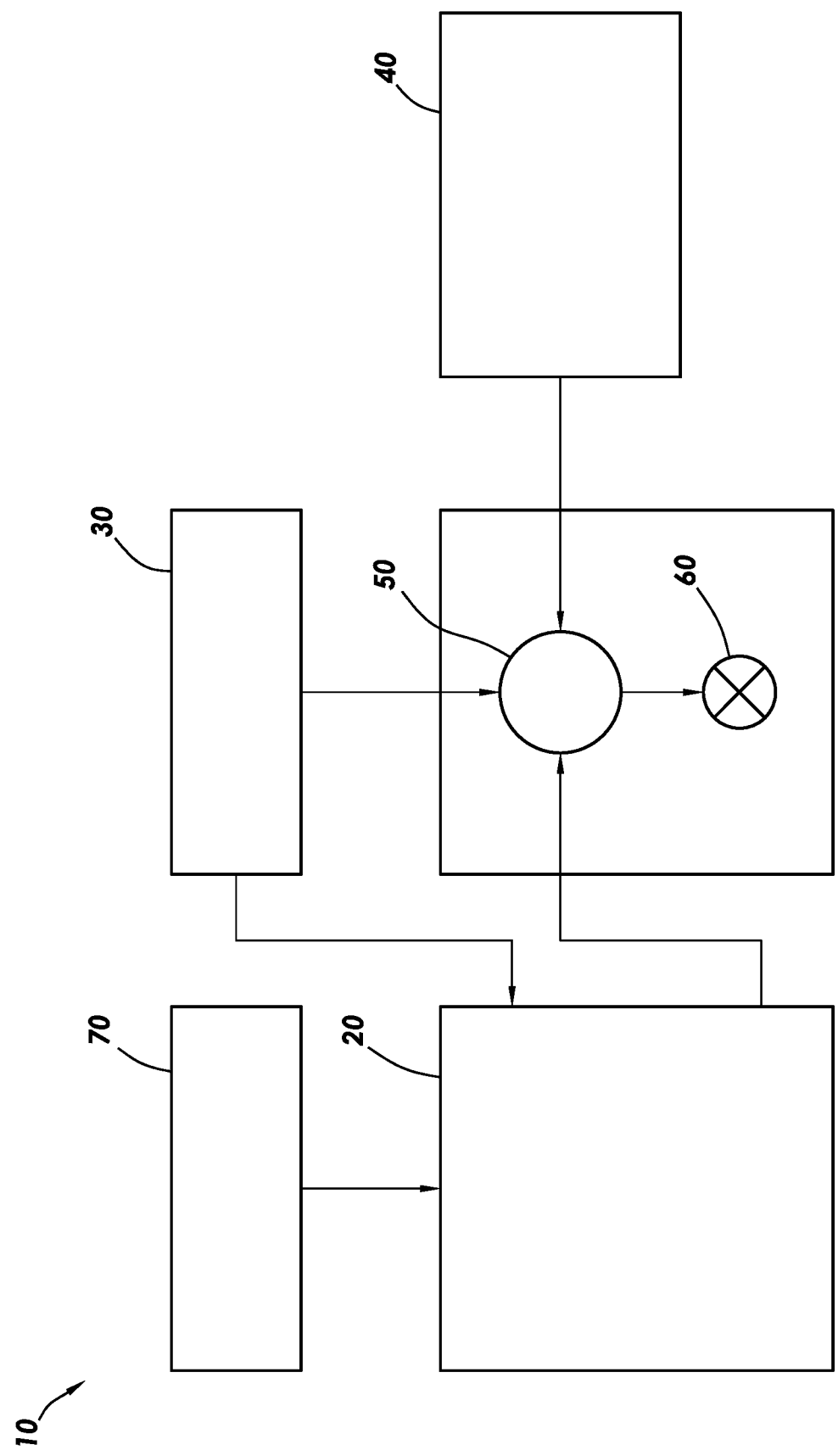
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention or disclosure. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates to methods and compositions for treating subterranean formations, and more specifically, to improved methods and compositions for reducing the viscosity of viscosified treatment fluids. Viscosified, or "gelled," treatment fluids may be used in a variety of operations in subterranean formations. For example, viscosified treatment fluids may be used as drilling fluids, fracturing fluids, diverting fluids, and gravel packing fluids. Viscosified treatment fluids may be sufficiently viscous to suspend particulates for a desired period of time, to transfer hydraulic pressure, to divert treatment fluids to another part of a formation, and/or to prevent undesired leak-off of fluids into a formation from the buildup of filter cakes. Many viscosified treatment fluids include gelling agents, or "viscosifiers," that may increase a treatment fluid's viscosity. The viscosifiers used in viscosified treatment fluids may include synthetic polymers, biopolymers, or other naturally-occurring polymers. For example, viscosifiers may include, inter alia, galactomannan gums, such as guar and locust bean gum, cellulosic polymers, and other polysaccharides.

In some applications, e.g., in subterranean well operations, after a viscosified treatment fluid has performed its desired function, the fluid may be "broken," wherein its viscosity is reduced. Breaking a viscosified treatment fluid may make it easier to remove the viscosified treatment fluid from the subterranean formation, a step that may be completed before the well is returned to production. Breaking of viscosified treatment fluids may be accomplished or facilitated by incorporating "breakers" into the viscosified treatment fluids.

Breakers may be selected to meet the needs of any given situation. A breaker may be selected based on one or more requirements of a treatment operation, including, but not limited to the temperature, pH, time, salinity, and desired viscosity profile for a specific treatment. Breakers suitable for treatment operations may include, but are not limited to, oxidative breakers, enzyme breakers, and acid breakers.

Oxidative breakers may be used to break viscosified treatment fluids at a variety of temperatures. In some embodiments, oxidative breakers may be used to break viscosified treatment fluids at temperatures above 93.3° C. (200° F.), e.g., by oxidative depolymerization of the polymer backbone. However, in lower temperature regimes these oxidizing agents may be ineffective for breaking a viscosified fluid within a desirable time period. Oxidative breakers may include, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, perborates, oxyacids of halogens and oxyanions of halogens.

Enzyme breakers may also be used to break fluids viscosified with natural polymers in oil field applications at a variety of temperatures. In some embodiments, enzyme breakers may be suitable for use at relatively low temperature (e.g., temperatures in a range of from about 25° C. (77° F.) to about 65.6° C. (150° F.). At higher temperature enzyme breakers may denature and become less effective. In certain embodiments, the use of an encapsulated enzyme breaker may shield the enzyme from the fluid environment and may delay the denaturization of the enzyme up to 79.4° C. (175° F.). In some embodiments, at very low temperatures, enzyme breakers may be less effective because the rate of breakage of polymer may be slower. Enzyme breakers may include, for example, hemicellulases, such as galactosidase and mannosidase; hydrolases; cellulases; pectinases; alpha-amylases; and xanthanases.

Acid breakers may also be used as breakers via hydrolysis reactions. Acid breakers, however, may pose practical difficulties during treatment operations. For example, acid breakers may be less desirable as a polysaccharide polymer breaker because of cost, poor break rate control, chemical compatibility difficulties, and corrosion of metal goods in a well. Acid breakers may include, for example, acetic anhydride, citric acid, fumic acid, benzoic acid, sulfonic acid, phosphoric acid, aliphatic polyesters, polylactic acid, polylactides, polyanhydrides, polyamino acids, and any combination thereof.

In certain embodiments of the present disclosure, one or more breakers may be added to a treatment fluid to "break" or reduce the viscosity of the treatment fluid. In some embodiments, the treatment fluids of the present disclosure may include multiple breakers that, when combined, may have a synergistic effect on their ability to break a viscosified treatment fluid. In one or more embodiments of the present disclosure, the treatment fluids may include a breaker system that includes a delayed release oxidative breaker and a delayed release enzyme breaker. In some embodiments, the breaker systems of the present disclosure may be or include an encapsulated material. In certain embodiments, the treatment fluids of the present disclosure may include one or more breaker systems. The breakers of the present disclosure may be combined into a single breaker system or may be added to the treatment fluid in multiple breaker systems.

In some embodiments, the delayed release enzyme breakers of the present disclosure may include, for example, hemicellulase and xanthanase. In one or more embodiments, different types of delayed release enzyme breakers may be used to break different types of bond in the polysaccharides. For example, some enzyme breakers may break only α-glycosidic linkage and some may break β-glycosidic linkage in polysaccharides. As a further example, some enzyme breakers may break polymers by hydrolysis and/or oxidative pathways. In some embodiments, the delayed release enzyme breaker may be hemicellulose. In other embodiments, the delayed release enzyme breaker may be xanthanase. In certain embodiments, hemicellulase may be used to break guar polymers and xanthanase may be used to break xanthan polymers. In some embodiments, the delayed release enzyme breaker may be present in the treatment fluid in a range of from about 0.01 kg/m$^3$ (0.08 lb/1000 gallon) to about 50 kg/m$^3$ (416.5 lb/1000 gallon). In other embodiments, the delayed release enzyme breaker may be present in the treatment fluid in a range of from about 0.02 kg/m$^3$ (0.17 lb/1000 gallon) to about 10 kg/m$^3$ (83.3 lb/1000 gallon). In still other embodiments, the delayed release enzyme breaker may be present in the treatment fluid in a range of from about 0.03 kg/m$^3$ (0.25 lb/1000 gallon) to about 5 kg/m$^3$ (41.65 lb/1000 gallon).

In some embodiments, the delayed release oxidative breakers of the present disclosure may include sodium persulfate. In other embodiments, the delayed release oxidative breaker may include ammonia persulfate. In one or more embodiments, the delayed release oxidative breaker may be selected from the group consisting of: magnesium oxide, sodium perborate, a persulfate, sodium bromate, sodium chlorite, any derivative thereof, and any combination thereof. In some embodiments, the delayed release oxidative breaker may be present in the treatment fluid in a range of from about 0.01 kg/m$^3$ (0.08 lb/1000 gallon) to about 50 kg/m$^3$ (416.5 lb/1000 gallon). In other embodiments, the delayed release oxidative breaker may be present in the treatment fluid in a range of from about 0.02 kg/m$^3$ (0.17 lb/1000 gallon) to about 25 kg/m$^3$ (208.3 lb/1000 gallon). In still other embodiments, the delayed release oxidative breaker may be present in the treatment fluid in a range of from about 0.03 kg/m$^3$ (0.25 lb/1000 gallon) to about 10 kg/m$^3$ (83.3 lb/1000 gallon).

In certain embodiments, the treatment fluid may also include a delayed acid breaker. The delayed acid breaker may be used to reduce the pH of the treatment fluid below a threshold pH value wherein the viscosity of the treatment fluid may be reduced. In some embodiments, the threshold pH value may be in a range of from about 8 to about 9. In other embodiments, the threshold pH value may be less than about 8.5. In still other embodiments, the threshold pH value may be less than about 8.3. In certain embodiments, the delayed acid breaker may be a suitable acid generating source. The acid generating source may be used to generate an acid within the wellbore. In some embodiments, the delayed acid breaker may include an ester. In other embodiments, the delayed acid breaker may include an encapsulated acid. For example, in some embodiments, the delayed acid breaker may include an encapsulated citric acid. In some embodiments, the delayed acid breaker may be present in the treatment fluid in a range of from about 0.01 kg/m³ (0.08 lb/1000 gallon) to about 4.8 kg/m³ (40 lb/1000 gallon. In other embodiments, the delayed acid breaker may be present in the treatment fluid in a range of from about 0.02 kg/m³ (0.17 lb/1000 gallon) to about 2.4 kg/m³ (20 lb/1000 gallon). In still other embodiments, the delayed acid breaker may be present in the treatment fluid in a range of from about 0.03 kg/m³ (0.25 lb/1000 gallon) to about 1.2 kg/m³ (10 lb/1000 gallon).

In certain embodiments, the treatment fluid may also include a gel stabilizer (also referred to in some instances as a temperature stabilizer). In one or more embodiments, the gel stabilizer may include an oxygen scavenger. For example, in some embodiments, the gel stabilizer may include sodium erythorbate. Sodium erythorbate may be purchased as Ferchek™ ferric iron inhibitor or Oxygon™ non-sulfite oxygen scavenger, both of which are commercially available from Halliburton Energy Services, Inc., Duncan, Okla. In other embodiments, the gel stabilizer may include sodium thiosulfate. Sodium thiosulfate may be purchased as Gel-Sta™ gel stabilizer, which is commercially available from Halliburton Energy Services, Inc., Duncan, Okla. In still other embodiments, the gel stabilizer may include sodium sulfite. In some embodiments, the gel stabilizer may be present in the treatment fluid in a range of from about 0.1 kg/m³ (0.83 lb/1000 gallon) to about 50 kg/m³ (416.5 lb/1000 gallon). In other embodiments, the gel stabilizer may be present in the treatment fluid in a range of from about 0.5 kg/m³ (4.17 lb/1000 gallon) to about 20 kg/m³ (166.6 lb/1000 gallon). In still other embodiments, the gel stabilizer may be present in the treatment fluid in a range of from about 1 kg/m³ (8.33 lb/1000 gallon) to about 10 kg/m³ (83.3 lb/1000 gallon).

Among the many potential advantages to the methods and compositions of the present disclosure, only some of which are alluded to herein, the methods, compositions, and systems of the present disclosure may provide improved viscosity breaking over a broad temperature range. The breaker systems of the present disclosure may function effectively over a wide temperature range whereas other fluid systems may require changes in breaker type or concentration for varying temperature ranges. For example, in certain embodiments, the breaker systems may be suitable for reducing viscosity of treatment fluids at temperatures in the range of from about 0° C. (32° F.) to about 350° C. (662° F.). In other embodiments, the breaker systems may be suitable for reducing viscosity of treatment fluids at temperatures in the range of from about 5° C. (41° F.) to about 350° C. (662° F.).

In one or more embodiments, the present disclosure provides a breaker system that includes a delayed release oxidative breaker and a delayed release enzyme breaker. In some embodiments, the present disclosure provides a breaker system that includes a delayed release oxidative breaker, a delayed release enzyme breaker, and a delayed release acid breaker. In other embodiments, the present disclosure provides a breaker system that includes a delayed release oxidative breaker, a delayed release enzyme breaker, and a gel stabilizer. In still other embodiments, the present disclosure provides a breaker system that includes a delayed release oxidative breaker, a delayed release enzyme breaker, a delayed release acid breaker, and a gel stabilizer.

In certain embodiments, the present disclosure provides a treatment fluid that includes a base fluid, a viscosifier, and a breaker system of the present disclosure. Viscosifiers that may be suitable for use with the treatment fluids of the present disclosure may include, for example, guar, hydroxypropyl-guar ("HPG"), carboxymethylhydroxypropylguar ("CMHPG"), hydroxyethyl cellulose ("HEC"), carboxymethylhydroxyethylcellulose ("CMHEC"), carboxymethyl cellulose ("CMC"), xanthan, any derivative of thereof, and any combination thereof. In certain embodiments, the present disclosure provides a treatment fluid that includes a base fluid, a viscosifier, a crosslinker, and a breaker system of the present disclosure. The crosslinker may be used to at least partially crosslink the viscosifiers and/or viscosifying agents above. Crosslinkers that may be suitable for use with the treatment fluids of the present disclosure may include, for example, borate, zirconium, titanium, aluminum, iron, ferric chloride, aluminum acetate, boric acid, any derivative thereof, and any combination thereof. In certain embodiments, the viscosifier may be present in a concentration range of from about 1 lb/1000 gal to about 100 lb/1000 gal. In certain embodiments, the treatment fluids of the present disclosure may have or exhibit a viscosity in the range of from about 10 cP to about 10,0000 cP.

In certain embodiments, the breaker system may be added to a single treatment fluid. In other embodiments, the breaker system may be added to multiple treatment fluids. In certain embodiments, the treatment fluid may be introduced into at least a portion of a wellbore penetrating a subterranean formation. In some embodiments, the breaker system may be added to a treatment fluid at a location proximate to a wellbore. In other embodiments, the breaker system may be premixed with the treatment fluid at an off-site location.

Without intending to be limited to any particular theory or mechanism, it is believed that the breaker systems of the present disclosure may function at a temperature range of from about 0° C. (32° F.) to about 350° C. (662° F.). In some embodiments, the enzyme breaker used in the breaker system of the present disclosure may function at temperatures in the range of from about 0° C. (32° F.) to about 60° C. (140° F.). In some embodiments, the enzyme breaker may function as a delayed release breaker once the pH of the treatment fluid is reduced to a pH in the range of from about 8 to about 9 or lower. Further, it is believed that the oxidative breaker may perform multiple functions. For example, in some embodiments, the oxidative breakers of the present disclosure may function at temperatures in the range of from about 60° C. (140° F.) to about 125° C. (257° F.). Additionally, the oxidative breakers used in the breaker systems of the present disclosure may also reduce the pH of the system. In certain embodiments, the initial pH of the treatment fluid may be at or above about 11 at which point the enzyme breaker may not be effective. In one or more embodiments, the oxidizing breakers used in the breaker system of the present disclosure may reduce the pH of the treatment fluid to the point where the enzyme breaker becomes more active. For example, in some embodiments, the oxidizing breaker may reduce the pH of the treatment fluid to about 7 or less. In one or more embodiments, an oxygen scavenger may be added to the treatment fluid. In some embodiments, the oxygen scavenger may also reduce the pH of the treatment fluid to the point where the enzyme breaker becomes more active. In certain embodiments, the oxygen scavenger may have a pH of from about 5.5 to about 8. In addition, in some embodiments, reducing the pH may reduce or remove any crosslinking effect of the treatment fluid with a subsequent reduction in viscosity. In one or more embodiments, the oxygen scavengers may be used to remove oxygen from the treatment fluid and stabilize the gel at higher temperatures.

In certain embodiments, the breaker system that includes a delayed release oxidizing breaker and a delayed release enzyme breaker may reduce the viscosity of the treatment fluid. In some embodiments, the breaker system may be activated by removing an encapsulating coating that encapsulates the delayed release enzyme breaker and the delayed release oxidative breaker. In certain embodiments, the encapsulated coating may generally surround the delayed release oxidative breaker and delayed release enzyme breaker to isolate them from their surroundings. The encapsulating coating may be used to isolate the breaker system from one or more triggers that would cause the breaker system to reduce the viscosity (i.e., break) of the treatment fluid. In certain embodiments, the encapsulating coating may include a layer of inert material, such as a thin polymer layer. The polymer layer may include poly(vinyl chloride) (PVC), polyvinylidene chloride (PVDC), polyvinylidene fluoride (PVDF), poly(tetrafluoroethylene), cellulose acetate, cellulose acetate butyrate, or similar polymers or co-polymers. Such polymers also may incorporate a clay, graphite, graphene, hexagonal boronitride, or similar plate-like phase as a reinforcing barrier in a composite coating. In certain embodiments, the shell may isolate the reactive core from water.

In certain embodiments, the encapsulating coating may include one or more of the following materials: polyacrylamide (PA); polyacrylamide copolymers; polylactic acid (PLA); polyglycolic acid (PGA) polyvinyl alcohol (PVOH); a polyvinyl alcohol copolymer; a methyl methacrylate; an acrylic acid copolymer; and any combination of one or more of these materials. In some embodiments, the encapsulating coating may be a material that has a relatively low temperature melting point. For example, in accordance with some embodiments, the encapsulating coating may be formed from a polymer having a relatively low melting point, which may allow the release of the breaker system (or certain components thereof) as the encapsulated breaker system travels downhole in the wellbore where the temperature increases accordingly with depth. In further embodiments, the encapsulating coating may be formed from materials designed to disintegrate or break down at the pressures experienced downhole in the wellbore. For example, in accordance with some embodiments, the encapsulating coating may have a sufficient thickness to be stable for the pressure used at the surface, but may be disintegrate or break down at higher pressures, such as the hydrostatic pressures that are present downhole in the wellbore. In further embodiments, the encapsulating coating may be formed from materials that degrade when exposed to particular pH conditions. For example, in accordance with some embodiments, the encapsulating coating may be stable when used in an acidic fracturing fluid but dissolve as the surrounding pH drops due to exposure to carbonate formations.

In certain embodiments, the encapsulating coating may generally include any material that will degrade by means of melting, dissolution, stress-induced cracking or rupture, erosion, or disintegration when exposed to a chemical solution, a chemical reaction, an ultraviolet light, a nuclear source, mechanical impact or abrasion, or a combination thereof. These components may be formed of any degradable material that is suitable for service in a downhole environment and that provides adequate strength to encapsulate and protect the breaker system. By way of example only, one such material is an epoxy resin that dissolves when exposed to a caustic fluid. Another such material is a fiberglass that dissolves when exposed to an oxidizing acidic or strong alkaline solution. Still another such material is a binding agent, such as an epoxy resin, for example, with glass reinforcement that dissolves when exposed to a chemical solution of caustic fluid or acidic fluid. Still another example is a material that includes a mixture of sinter metals including an alkali metal or alkaline earth metal that may dissolve in response to temperature and salinity. Any of these materials could also degrade when exposed to an ultraviolet light or a nuclear source. Thus, the materials used to form the encapsulating coating may degrade by one or more of dissolving, breaking down, eroding, or disintegrating from exposure to certain wellbore conditions (e.g., pH, temperature, salinity, pressure gradient, and pressure), a chemical solution, a chemical reaction, or from exposure to an ultraviolet light or a nuclear source, or by a combination thereof. The particular material matrix used to form the dissolvable components of the encapsulating coating may be customizable for operation within particular pH, pressure, pressure gradient, and temperature ranges, or to control the rate of dissolution of the encapsulating coating when exposed to these conditions, a chemical solution, an ultraviolet light, a nuclear source, or a combination thereof.

The treatment fluids used in the compositions and methods of the present disclosure may include any base fluid known in the art, including aqueous base fluids, non-aqueous base fluids, and any combination thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, and any combination thereof. In many embodiments of the present disclosure, the aqueous fluids may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and compositions of the present disclosure include, but are not limited to, oils, hydrocarbons, organic liquids, and the like. In certain embodiments, the base fluids may include a mixture of one or more fluids and/or gases, including but not limited to emulsions, foams, and the like.

In certain embodiments, the treatment fluids used in the methods and systems of the present disclosure optionally may include any number of additional additives. Examples of such additional additives include, but are not limited to, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, additional oxygen scavengers, lubricants, additional viscosifiers, additional breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the alcohols, salt control additives, and/or other components of the treatment fluid may be metered directly into a base treatment fluid to form a treatment fluid. In certain embodiments, the base fluid may be mixed with the alcohols, salt control additives, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid ready for use in a fracture stimulation treatment of the well 60 or a concentrate to which additional fluid is added prior to use in a fracture stimulation of the well 60. In some embodiments, the fracturing fluid producing apparatus 20 can be omitted and the fracturing fluid sourced directly from the fluid source 30. In certain embodiments, the fracturing fluid may include water, a hydrocarbon fluid, a polymer gel, foam, air, wet gases and/or other fluids.

The proppant source 40 can include a proppant for combination with the fracturing fluid. In certain embodiments, one or more treatment particulates of the present disclosure may be provided in the proppant source 40 and thereby combined with the fracturing fluid with the proppant. The system may also include additive source 70 that provides one or more additives (e.g., delayed release acid breakers, viscosifiers, gel stabilizers, and/or other additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In certain embodiments, the other additives 70 may include carbonate and/or bicarbonate.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particles, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particles at other times, and combination of those components at yet other times.

Figure 2:
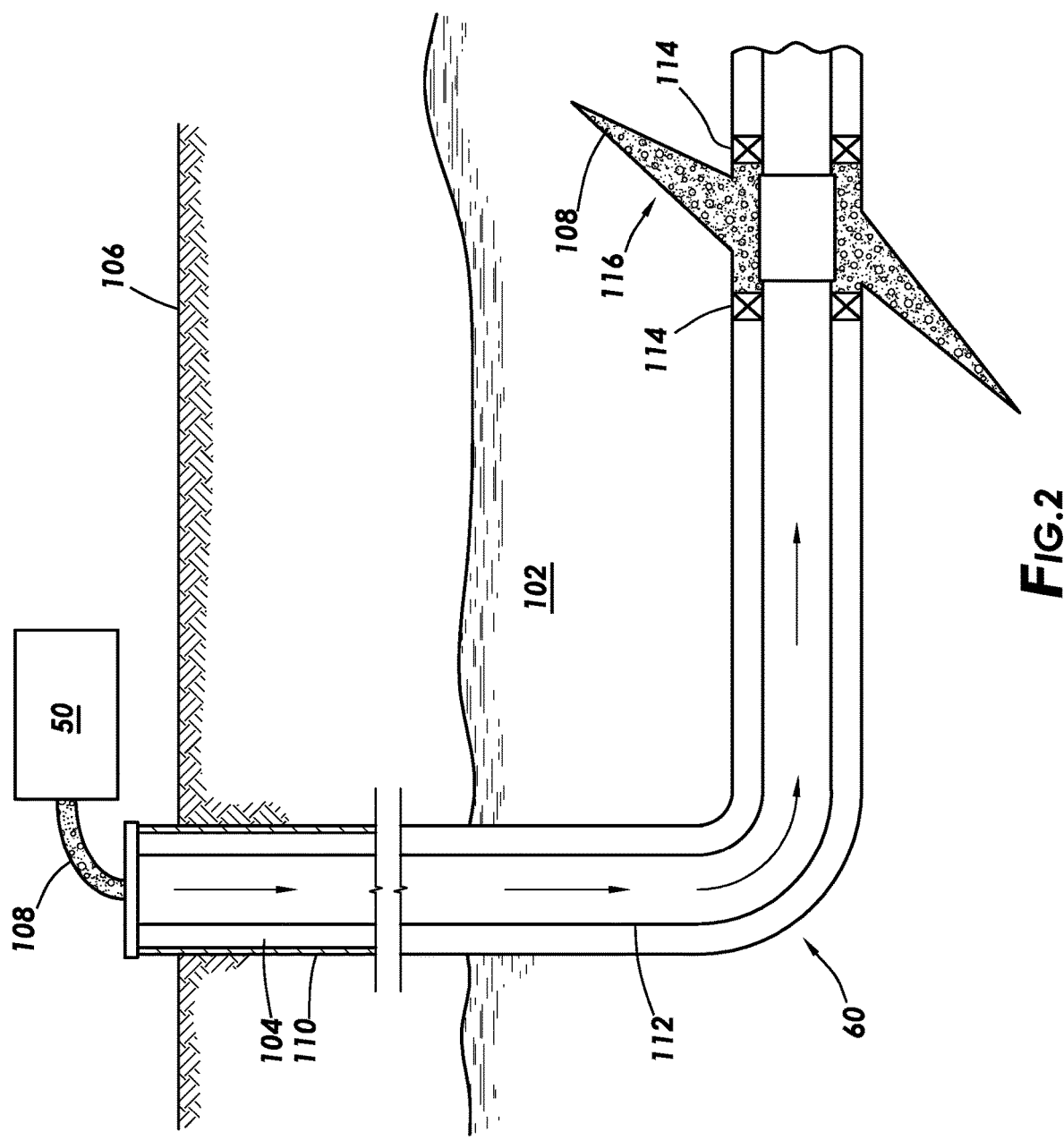
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. The pump and blender system 50 is coupled a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates (and/or treatment particulates of the present disclosure) in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combination thereof, and the like.

In one or more embodiments, the treatment fluids of the present disclosure may be used in a subterranean formation prior to a steam-assisted gravity drainage ("SAGD") process or treatment in the formation. A SAGD process may involve any suitable thermal method of recovering viscous hydrocarbons utilizing spaced horizontal wells. In some embodiments, an SAGD process may include three stages: the start-up stage; the production stage; and the wind-down (or blowdown) stage. In some embodiments, the production stage may include further sub-stages such as, for example, a ramp-up stage and a plateau stage. In certain embodiments, the SAGD process may include delivering pressurized steam through an upper, horizontal, injection well (injector), into a viscous hydrocarbon reservoir while hydrocarbons are produced from a lower, parallel, horizontal, production well (producer) that is near the injection well and is vertically spaced from the injection well. In one or more embodiments, the injection and production wells may be situated in the lower portion of the reservoir, with the producer located close to the base of the hydrocarbon reservoir to collect the hydrocarbons that flow toward the base of the reservoir.

Without intending to be limited to any particular theory or mechanism, it is believed that, in some embodiments, the injected steam initially may mobilize the hydrocarbons to create a steam chamber in the reservoir around and above the horizontal injection well. In certain embodiments, the term "steam chamber" may be utilized to refer to the volume of the reservoir that is saturated with injected steam and from which mobilized oil has at least partially drained and does not necessarily require an enclosed or separated space. In one or more embodiments, as the steam chamber expands, viscous hydrocarbons in the reservoir and water originally present in the reservoir may be heated and mobilized and move with aqueous condensate, under the effect of gravity, toward the bottom of the steam chamber. In some embodiments, the hydrocarbons, the water originally present, and the aqueous condensate may be referred to collectively as an emulsion. In one or more embodiments, the emulsion may accumulate such that the liquid/vapor interface may be located below the steam injector and above the producer. In certain embodiments, the emulsion may be collected and produced from the production well. In some embodiments, the produced emulsion may be separated into dry oil for sales and produced water, that includes the water originally present and the aqueous condensate.

As described above, the treatment fluids of the present disclosure may be used in hydraulic fracturing treatments. In those embodiments, the treatment fluid may be introduced at a pressure sufficient to create or enhance one or more fractures within the subterranean formation (e.g., hydraulic fracturing). In certain embodiments, once the subterranean formation has been sufficiently stimulated (e.g., by creating or enhancing one or more fractures penetrating at least a portion of the subterranean formation and/or by placing a suitable quantity of proppant into the one or more fractures), it may be desirable to reduce the viscosity of the treatment fluid. In some embodiments, reducing the viscosity (e.g., breaking) of the treatment fluid may allow for easier recovery of the treatment fluid from the subterranean formation. In one or more embodiments, reducing the viscosity of the treatment fluid may facilitate increased production or treatment fluid recovery from the subterranean formation, e.g., by increasing the efficiency of a subsequent SAGD process.

In some embodiments, the temperature of the subterranean formation into which hydraulic fracturing fluids are injected may be unknown and vary significantly during a single hydraulic fracturing treatment. For example, in embodiments where a subsequent SAGD process is performed, the temperature of a particular fracture may vary depending on its location in the subterranean formation and proximity to the steam chamber. In certain embodiments, the fracture may penetrate the steam chamber, thereby greatly increasing the temperature of the fracture and fluid hydraulic fracturing fluids. Without intending to be limited to any particular theory or mechanism, in embodiments where a SAGD process is performed subsequent to a hydraulic fracturing treatment, the treatment fluids of the present disclosure may allow the fracturing treatment fluid to initiate the fracture at one temperature and extend into the significantly different temperature region of the formation without breaking prematurely (which would result in no fracture extension into the different temperature zone of the formation) and on completion of the fracturing treatment reduce the viscosity of the fracturing treatment fluid across the broad range of formation and fracture temperatures to greater recovery of the treatment fluid across the unknown temperature ranges within the subterranean formation. For example, in embodiments where the fracture containing the treatment fluid is at a low temperature (e.g., from about 0° C. (32° F.) to about 60° C. (140° F.)), the delayed release enzyme breakers of the present disclosure may function to break the treatment fluid used in the hydraulic fracturing treatment. In embodiments where the fracture containing the treatment fluid is at a high temperature (e.g., from about 60° C. (140° F.) to about 350° C. (662° F.)), the delayed release oxidative breakers of the present disclosure may function to break the treatment fluid used in the hydraulic fracturing treatment. Additionally, as described above, the oxidative breakers used in the breaker systems of the present disclosure may also reduce the pH of the system to the point where the delayed release enzyme breaker becomes more active.

Example

Rheology performance results were obtained for sample treatment fluids that includes certain breaker systems of the present disclosure. The composition of the treatment fluid used for these tests is provided in Table 1 below.

TABLE 1

| Component | Concentration |
|---|---|
| NaOH pH Control Agent | 1.25 L/m$^3$ |
| Oxygen Scavenger | 4.0 kg/m$^3$ |
| Delayed Borate Crosslinker | 3.0 L/m$^3$ |
| Non-delayed Borate Crosslinker | 0.3 L/m$^3$ |
| Encapsulated High-Temperature Enzyme Breaker | 0.4 kg/m$^3$ |
| Encapsulated Ammonium Perfsulfate | 0.3 kg/m$^3$ |

The sample treatment fluids were created by decanting one liter of Red Deer Tap water into a Waring blender and the speed of the blender was adjusted to create a one inch vortex. Next, 4.8 g of guar polymer gelling agent was slowly added to the water to prevent clumping. The guar polymer gelling agent and water were allowed to mix and hydrate for 30 minutes. The resulting gel was removed from the Waring blender and divided into 250 mL sub samples. Viscosity and pH of each sub sample were measured and recorded. Each 250 mL sub sample of guar polymer gelling agent and water was then put in a Waring blender and speed adjusted so that a vortex formed deep enough to expose the top of the blender blade assembly. The listed concentration of oxygen scavenger was added and allowed to mix for 30 seconds. The listed concentration of NaOH pH control agent was then added and allowed to mix for 30 seconds. The listed concentration of delayed borate crosslinker was added, followed immediately by the listed concentration of non-delayed borate crosslinker. The fluid was mixed for an additional 30-60 seconds until the fluid crosslinked forming a crown in the blender jar.

Break tests were performed on each sample dynamically at the following temperatures 20° C. (68° F.); 70° C. (158° F.); 100° C. (212° F.); 125° C. (257° F.); and 150° C. (302° F.). A sub sample (52 mL) of the fluid described above was taken from the blender jar and transferred to a Chandler Model 5550 sample cup cell. The Chandler M5550 was equipped with a R1 Rotor, B5 Bob and F440 spring. The listed concentration of encapsulated high temperature enzyme breaker and encapsulated ammonium persulfate were added to the 52 mL sample in the Chandler Sample Cell. The Sample Cell was then threaded onto the Chandler M5550. Pressure was applied to the sample using nitrogen at 300 psi. The sample was then heated to test temperature (as shown in FIGS. 3-6). The viscosity of the fluid was measured at 40 sec$^{-1}$. The results of these tests are provided in Table 2 and Table 3 below and are plotted in FIGS. 3-6.

TABLE 2

| Test Temp (° C.)/(° F.) | 20/68 | 70/158 | 80/176 | 100/212 | 125/257 | 150/302 |
|---|---|---|---|---|---|---|
| Base Temp (° C.)/(° F.) | 20/68 | 24/75.2 | 24/75.2 | 20/68 | 20/68 | 20/68 |
| Base Gel pH | 8.21 | 8.48 | 8.48 | 8.48 | 8.58 | 8.53 |
| Buffered Gel pH | 12.22 | 12.10 | 12.10 | 12.15 | 12.19 | 12.18 |
| Vortex Closure (seconds) | 21 | 15 | 15 | 18 | 20 | 19 |
| Crosslink pH | 11.57 | 11.50 | 11.50 | 11.42 | 11.36 | 11.55 |
| Final pH | 10.16 | 8.04 | 8.29 | 7.78 | 8.03 | 8.69 |
| Stability Time (minutes) | 330 | 831 | 994 | 227 | 37 | 2 |
| Break Time (minutes) | 624 | 1965 | 1848 | 1945 | 220 | 24 |
| Termination Time (minutes) | 840 | 2000 | 2000 | 2000 | 448 | 31 |

TABLE 3

| | |
|---|---|
| 20° C. (68° F.) Stability to 400 cP (min) | 330 |
| 20° C. (68° F.) Dynamic Break (min) | 624 (1440 static) |
| 50° C. (122° F.) Stability to 400 cP (min) | n/a |
| 50° C. (122° F.) Dynamic Break (min) | n/a |
| 70° C. (158° F.) Stability to 400 cP (min) | 831 |
| 70° C. (158° F.) Dynamic Break (min) | 1965 (3000 static) |
| 100° C. (212° F.) Stability to 400 cP (min) | 227 |
| 100° C. (212° F.) Dynamic Break (min) | 1945 |
| 125° C. (257° F.) Stability to 400 cP (min) | 37 |
| 125° C. (257° F.) Dynamic Break (min) | 220 |
| 150° C. (302° F.) Stability to 400 cP (min) | 2 |
| 150° C. (302° F.) Dynamic Break (min) | 24 |

Figure 3:
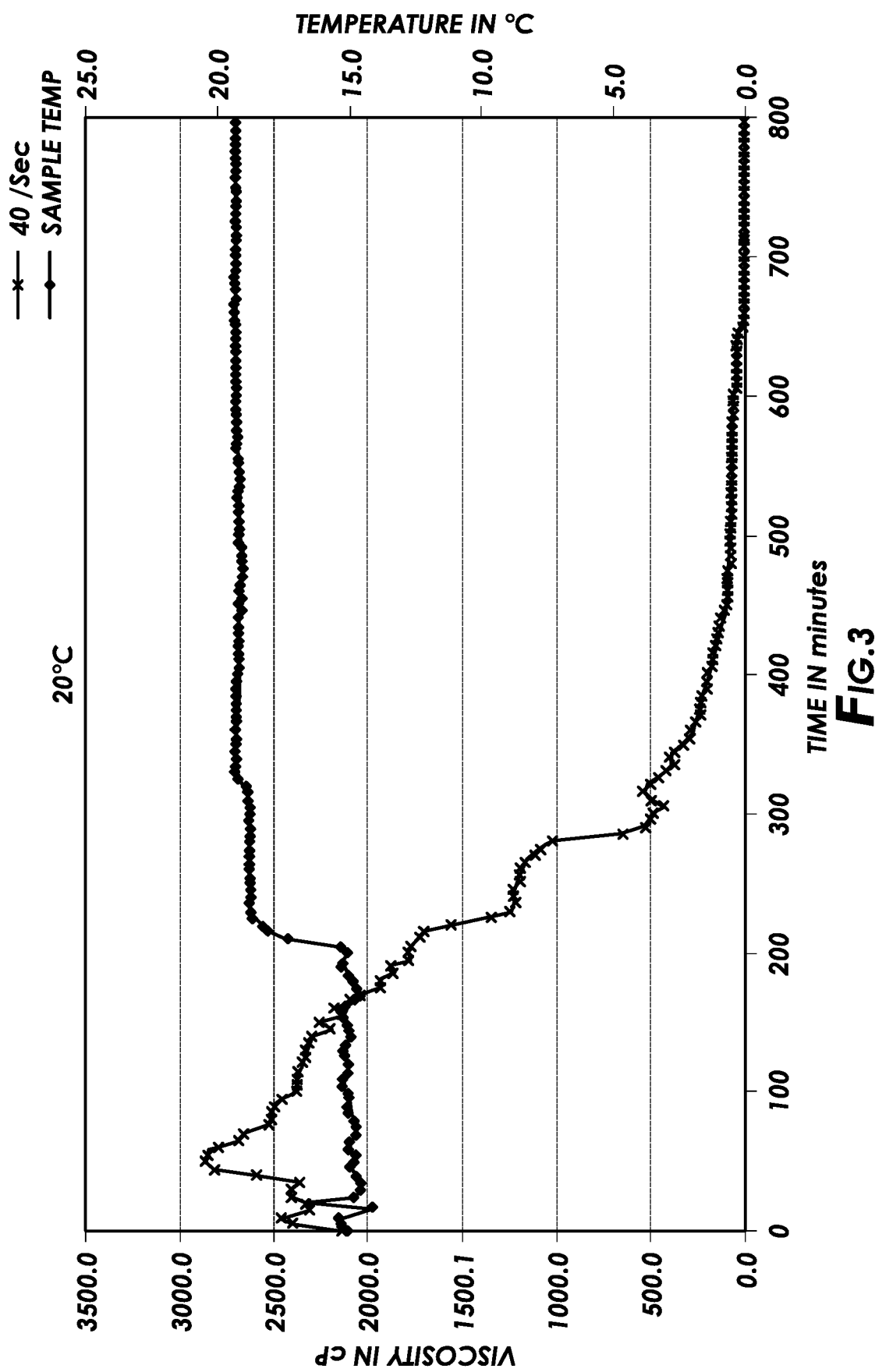
FIG. 3 is a graph illustrating rheology testing results obtained while breaking of a treatment fluid using breaker systems in accordance with certain embodiments of the present disclosure.
Figure 4:
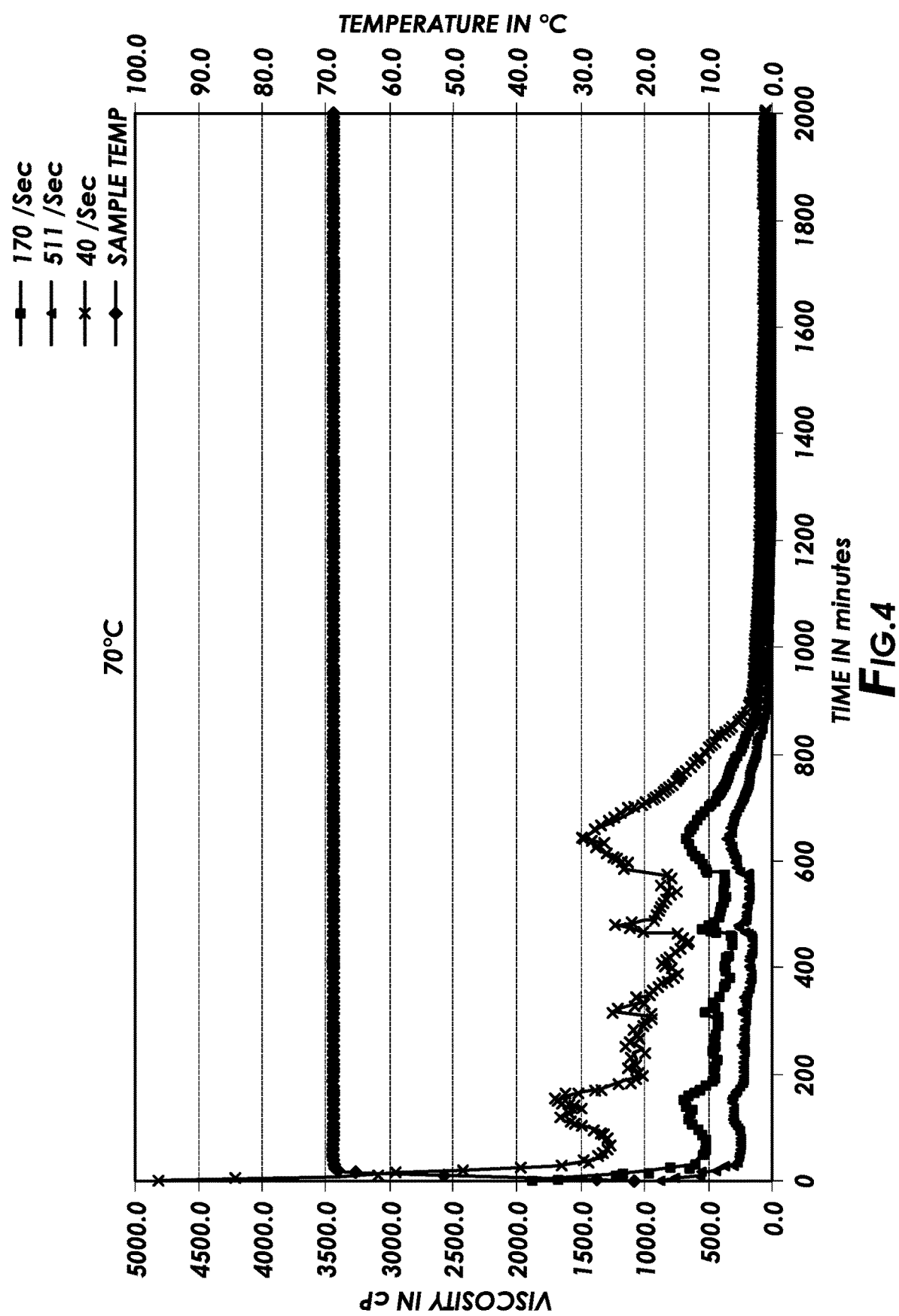
FIG. 4 is a graph illustrating rheology testing results obtained while breaking of a treatment fluid using breaker systems in accordance with certain embodiments of the present disclosure.
Figure 5:
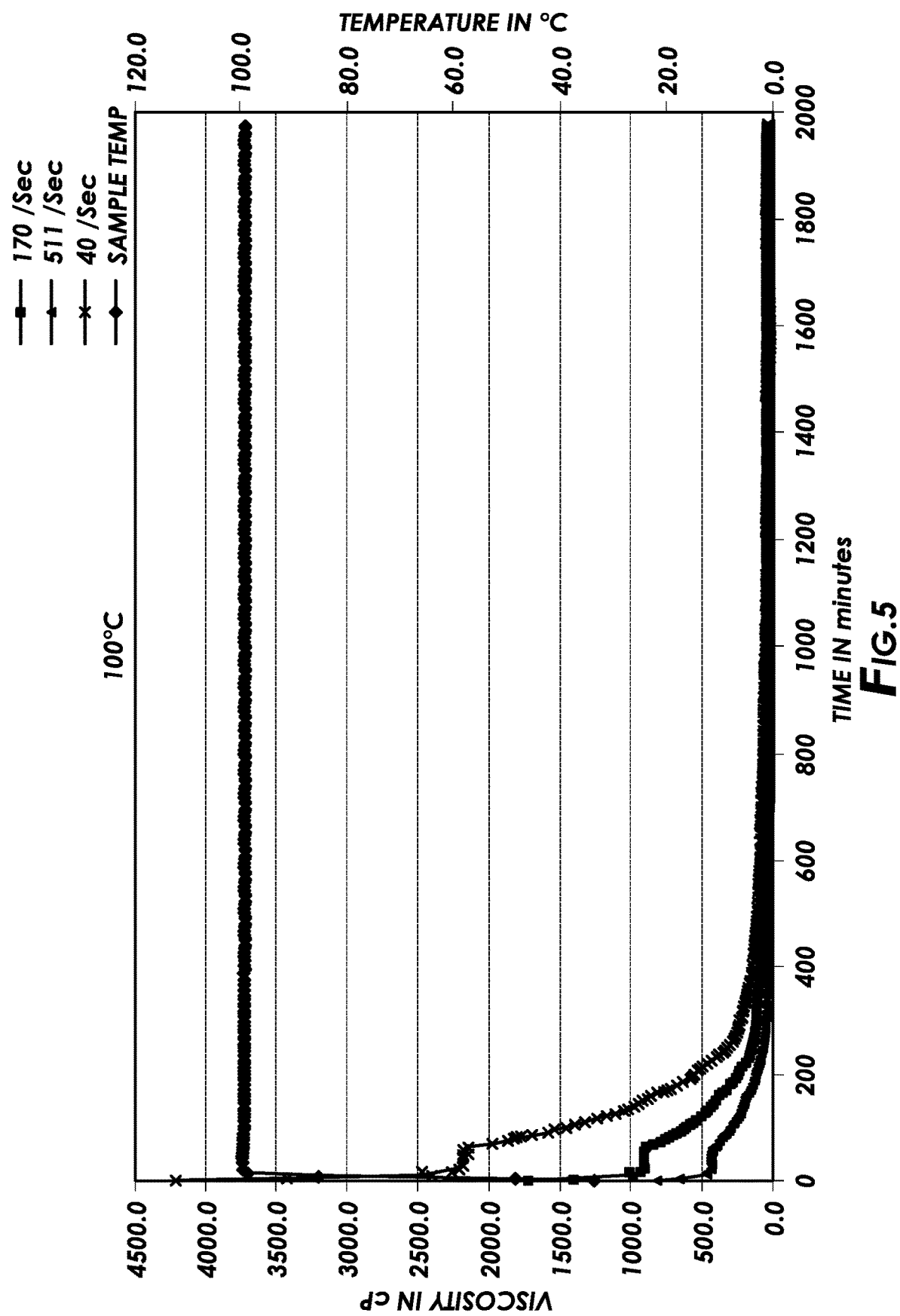
FIG. 5 is a graph illustrating rheology testing results obtained while breaking of a treatment fluid using breaker systems in accordance with certain embodiments of the present disclosure.
Figure 6:
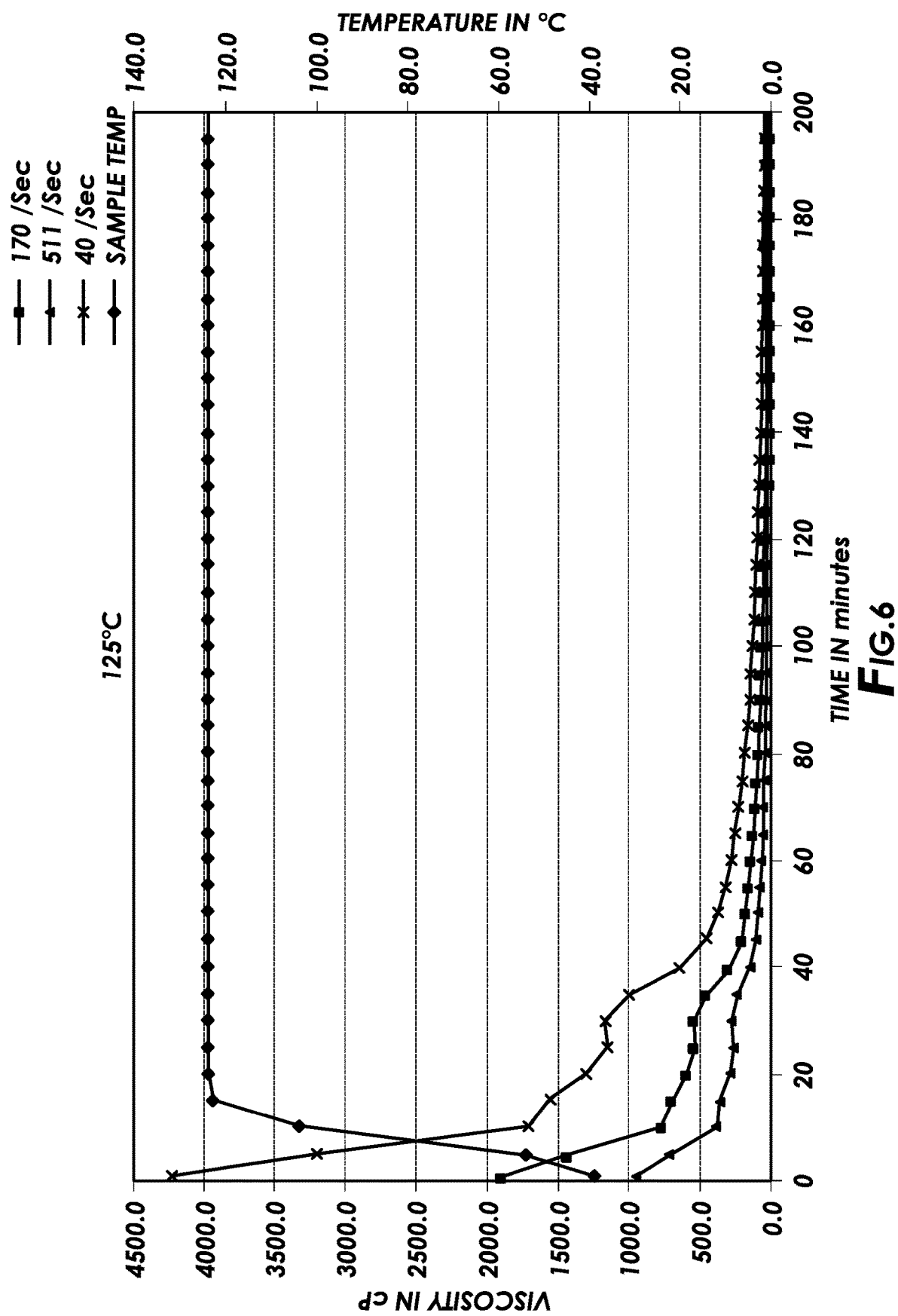
FIG. 6 is a graph illustrating rheology testing results obtained while breaking of a treatment fluid using breaker systems in accordance with certain embodiments of the present disclosure.

FIG. 3 is a graph illustrating rheology testing results taken at a temperature of 20° C. (68° F.). FIG. 3 shows viscosity measured at 40 sec$^{-1}$ as a function of time. The break time was calculated as the time at which the viscosity dropped below 10 cP as measured at 511 sec$^{-1}$. FIG. 4 is a graph illustrating rheology testing results taken at a temperature of 70° C. (158° F.). FIG. 4 shows viscosity measured at 40 sec$^{-1}$, 170 sec$^{-1}$, and 511 sec$^{-1}$ as a function of time. The break time was calculated as the time at which the viscosity dropped below 10 cP as measured at 511 sec$^{-1}$. FIG. 5 is a graph illustrating rheology testing results taken at a temperature of 20° C. (68° F.). FIG. 5 shows viscosity measured at 40 sec$^{-1}$, 170 sec$^{-1}$, and 511 sec$^{-1}$ as a function of time. The break time was calculated as the time at which the viscosity dropped below 10 cP as measured at 511 sec$^{-1}$. FIG. 6 is a graph illustrating rheology testing results taken at a temperature of 20° C. (68° F.). FIG. 6 shows viscosity measured at 40 sec$^{-1}$, 170 sec$^{-1}$, and 511 sec$^{-1}$ as a function of time. The break time was calculated as the time at which the viscosity dropped below 10 cP as measured at 511 sec$^{-1}$ An embodiment of the present disclosure is a method that includes providing a treatment fluid including a base fluid, a viscosifier, and a breaker system including a gel stabilizer; a delayed release oxidative breaker; and a delayed release enzyme breaker; and allowing the breaker system to reduce a viscosity of the treatment fluid.

In one or more embodiments described in the preceding paragraph, the gel stabilizer is an oxygen scavenger. In one or more embodiments described above, the treatment fluid further includes a delayed acid breaker. In one or more embodiments described above, the delayed acid breaker is selected from the group consisting of: an ester, an encapsulated acid, any derivative there, and any combination thereof. In one or more embodiments described above, the breaker system includes an encapsulating coating. In one or more embodiments described above, the step of allowing the breaker system to reduce the viscosity of the treatment fluid at least partially occurs in a portion of a subterranean formation having a temperature of from about 0° C. (32° F.) to about 350° C. (662° F.). In one or more embodiments described above, the method further includes introducing the treatment fluid into a wellbore penetrating at least a portion of a subterranean formation. In one or more embodiments described above, the step of introducing the treatment fluid into the wellbore penetrating at least a portion of the subterranean formation further includes introducing the treatment fluid at or above a pressure sufficient to create or enhance one or more fractures within the subterranean formation. In one or more embodiments described above, the method further includes performing a steam assisted gravity drainage process after introducing the treatment fluid at or above the pressure sufficient to create or enhance one or more fractures within the subterranean formation. In one or more embodiments described above, the step of introducing the treatment fluid into the wellbore is performed using one or more pumps. In one or more embodiments described above, the delayed release oxidative breaker is selected from the group consisting of: magnesium oxide, sodium perborate, a persulfate, sodium bromate, sodium chlorite, any derivative thereof, and any combination thereof. In one or more embodiments described above, wherein the delayed release enzyme breaker is selected from the group consisting of hemicellulose, xanthanase, any derivative thereof, and any combination thereof.

Another embodiment of the present disclosure is a method including providing a treatment fluid including a base fluid, a viscosifier, a delayed acid breaker, and a breaker system including: an oxygen scavenger; a delayed release oxidative breaker; a delayed release enzyme breaker; and introducing the treatment fluid into a wellbore penetrating at least a portion of the subterranean formation at or above a pressure sufficient to create or enhance one or more fractures within the subterranean formation; performing a steam assisted gravity drainage process; allowing the breaker system to reduce a viscosity of the treatment fluid.

In one or more embodiments described in the preceding paragraph, the step of allowing the breaker system to reduce the viscosity of the treatment fluid at least partially occurs in a portion of the subterranean formation having a temperature of from about 0° C. (32° F.) to about 350° C. (662° F.).

Another embodiment of the present disclosure is a composition including a gel stabilizer; a delayed release oxidative breaker; and a delayed release enzyme breaker.

In one or more embodiments described in the preceding paragraph, the composition further includes a delayed acid breaker. In one or more embodiments described above, the delayed acid breaker is selected from the group consisting of: an ester, an encapsulated acid, any derivative there, and any combination thereof. In one or more embodiments described above, the delayed release oxidative breaker is selected from the group consisting of: magnesium oxide, sodium perborate, a persulfate, sodium bromate, sodium chlorite, any derivative thereof, and any combination thereof. In one or more embodiments described above, the delayed release enzyme breaker is selected from the group consisting of hemicellulose, xanthanase, any derivative thereof, and any combination thereof. In one or more embodiments described above, the composition further includes an encapsulating coating substantially surrounding the gel stabilizer, the delayed release oxidative breaker, and the delayed release enzyme breaker.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising a base fluid, a viscosifier, and a breaker system comprising
a gel stabilizer;
a delayed release oxidative breaker; and
a delayed release enzyme breaker;
introducing the treatment fluid into a wellbore penetrating at least a portion of a subterranean formation at or above a pressure sufficient to create or enhance one or more fractures within the subterranean formation;
performing a steam assisted gravity drainage process after introducing the treatment fluid, wherein the subterranean formation has two or more different regions with at least two unknown temperatures within the range from about 0° C. (32° F.) to about 350° C. (662° F.);
allowing the treatment fluid to initiate the one or more fractures and enter at least two or more different regions of the subterranean formation without breaking the treatment fluid; and
allowing the breaker system to reduce a viscosity of the treatment fluid in the two or more different regions of the subterranean formation.

2. The method of claim 1, wherein the gel stabilizer is an oxygen scavenger.

3. The method of claim 1, wherein the treatment fluid further comprises a delayed acid breaker.

4. The method of claim 3, wherein the delayed acid breaker is selected from the group consisting of: an ester, an encapsulated acid, any derivative there, and any combination thereof.

5. The method of claim 1, wherein the breaker system comprises an encapsulating coating.

6. The method of claim 1, wherein the step of introducing the treatment fluid into the wellbore is performed using one or more pumps.

7. The method of claim 1, wherein the delayed release oxidative breaker is selected from the group consisting of: magnesium oxide, sodium perborate, a persulfate, sodium bromate, sodium chlorite, any derivative thereof, and any combination thereof.

8. The method of claim 1, wherein the delayed release enzyme breaker is selected from the group consisting of hemicellulase, xanthanase, any derivative thereof, and any combination thereof.

9. The method of claim 3, wherein the delayed acid breaker is in the treatment fluid in an amount of from about 0.01 kg/m$^3$ (0.08 lb/1000 gallon) to about 4.8 kg/m$^3$ (40 lb/1000 gallon).

\* \* \* \* \*